United States Patent [19]

Tamura

[11] 4,422,102
[45] Dec. 20, 1983

[54] LASER RECORDING METHOD AND APPARATUS SIMULTANEOUSLY SCANNING AND READING OUT ADJACENT DATA

[75] Inventor: Yasuyuki Tamura, Kawasaki, Japan

[73] Assignee: Canon Kabushiki Kaisha, Tokyo, Japan

[21] Appl. No.: 413,776

[22] Filed: Sep. 1, 1982

Related U.S. Application Data

[63] Continuation of Ser. No. 151,685, May 20, 1980, abandoned.

[30] Foreign Application Priority Data

May 25, 1979 [JP] Japan .................................. 54-64801
May 25, 1979 [JP] Japan .................................. 54-64802

[51] Int. Cl.³ .......................... H04N 1/06; H04N 1/40
[52] U.S. Cl. ..................................... 358/302; 358/296
[58] Field of Search .............. 358/296, 298, 299, 302, 358/283, 285, 288, 293

[56] References Cited

U.S. PATENT DOCUMENTS

| | | | |
|---|---|---|---|
| 3,272,918 | 9/1966 | Koll et al. ............................. | 358/298 |
| 3,541,245 | 11/1970 | Wilby ................................... | 358/287 |
| 3,800,080 | 3/1974 | Fuwa ................................ | 358/293 X |
| 4,075,663 | 2/1978 | Wellendorf .......................... | 358/298 |
| 4,080,634 | 3/1978 | Schreiber ............................ | 358/298 |
| 4,081,843 | 3/1978 | Okano ............................. | 358/293 X |
| 4,149,195 | 4/1979 | Gast .................................. | 358/283 |
| 4,163,605 | 8/1979 | Yamada .............................. | 358/287 |
| 4,169,275 | 9/1979 | Gunning ............................. | 358/300 |
| 4,196,454 | 4/1980 | Warren .......................... | 358/298 X |
| 4,279,002 | 7/1981 | Rider ............................. | 358/300 X |
| 4,302,782 | 11/1981 | Gunning et al. ................. | 358/300 X |

Primary Examiner—Bernard Konick
Assistant Examiner—Donald McElheny, Jr.
Attorney, Agent, or Firm—Fitzpatrick, Cella, Harper & Scinto

[57] ABSTRACT

A laser recording method in which recording is made on the recording medium by using the laser light modulated corresponding to the original to be recorded. The original to be recorded is line read out at a predetermined clock frequency in the main scanning direction of the original reading out device having a photoelectric conversion element. The read out signal of the original reading out device is sent to a memory capable of storing at least the signals belonging to the line now being read out and the signals belonging to the immediately preceding line. The signals belonging to the line immediately preceding the line being read out are read out from the memory to accomplish laser modulation and are then recorded on the recording medium.

6 Claims, 7 Drawing Figures

LASER RECORDING METHOD AND APPARATUS SIMULTANEOUSLY SCANNING AND READING OUT ADJACENT DATA

This is a continuation of application Ser. No. 151,685, filed May 20, 1980, now abandoned.

BACKGROUND OF THE INVENTION

1. Field of the Invention

This invention relates to a laser recording method and a laser recording apparatus or more particularly to a laser recording method and a laser recording apparatus in which the original is scanned by a solid state image sensor to convert the data on the original into time sequential picture signals and the picture is recorded on the light sensitive recording medium by controlling the laser beam by the picture signals.

2. Description of the Prior Art

Various kinds of laser recording methods and apparatuses have been offered and practiced in recent years, in which lines are scanned using a laser that has been modulated according to the data to be recorded on a light sensitive recording medium such as a photoconductive light sensitive body to form an electrostatic latent image which conforms to the data to be recorded and which then utilize this latent image.

Among these laser recording methods and laser recording apparatus, the system in which laser recording is made while scanning and reading out the original to be recorded is offered as an effective system.

In this system, since a recording is made every time a line of the original is scanned, it is simple in construction and highly economical compared with the apparatus in which the original is read out in advance, the read-out signals are all memorized, and then the signals are read out from the memory.

In these conventional methods and apparatus the line reading and scanning of the original has been controlled according to the detection of the recording starting position and the recording ending position of the laser beam.

In making a laser beam recording, however, although the polygonal mirror used in the scanning of laser beam performs scanning while each mirror surface is moving through a position facing the laser light source, the actual scanning time available for recording is only 60% of the scanning time of each surface.

One reason for this is that the laser beam incident upon the polygonal mirror is a spot having a predetermined area, and the recording is made while the entire spot is incident upon the mirror surface.

Attempts to increase each scanning time by increasing the number of revolutions of the polygonal mirror are not always successful because there is a limit in the response speed of the solid state image sensor (normally a CCD) used ordinarily in line reading of the original.

SUMMARY OF THE INVENTION

An object of this invention is to offer a novel and excellent laser recording method and laser recording apparatus.

A further object of this invention is to offer a simple but effective laser recording method and laser recording apparatus.

Another object of this invention is to offer a laser recording method and laser recording apparatus provided with a simple image magnifying function.

The laser recording method according to this invention is characterized in that the original to be recorded is read line by line in the main scanning direction of the original reading out means having a photoelectric conversion element at a first clock frequency. The read out signals from the original reading out means are sent to memory means which memorize at least the signals corresponding to the line then being read out and the signals corresponding to the line immediately before this line and on the other hand, the signals corresponding to the line immediately before the line then being read out are read out from the memory, laser modulated, and then recorded on the recording medium.

The laser recording apparatus according to this invention is characterized in that said apparatus has an original reading out means having photoelectric conversion element, a means of generating the first clock signals which set the reading speed of the original reading out means, a memory means having a capacity of storing the signals corresponding to the line then being read by the original reading out means and to the line read out immediately before the line, a memory reading out means to read out signals from the memory means, and a means of generating second clock signals which set the read out speed of the memory reading out means and in that said apparatus reads out and memorizes the signals corresponding to the immediately preceding line memorized in the memory means while said original reading out means is performing line read out operation.

Further, the laser recording method which is enabled to perform variable magnification of the original in accordance with this invention is characterized in that the original to be recorded is line read out at the first clock frequency in the main scanning direction of the original reading out means provided with a photoelectric conversion element, the line reading out position is shifted by the feed amount set in the sub-scanning direction relative to the original corresponding to the recording magnification, the line read out signals of the original reading out means are set to the memory capable of storing at least the line signals now being read out and the line signals of the immediately preceding line, and on the other hand, during the line read scanning, the signals of the immediately preceding line which have already stored are read out at the second clock frequency set corresponding to the recording magnification, laser modulated, and the recording of predetermined recording magnification is made on the recording medium by scanning the medium with the modulated laser light.

The laser recording apparatus capable of variable magnification in accordance with this invention is characterized in that the apparatus has an original reading out means having photoelectric conversion element, a means of generating the first clock signals which set the read out speed of the original reading out means in the original main scanning direction, a means of shifting the original relative to the original reading out means in the direction of original subscanning, a means of setting the amount of relative shifting of the relative shifting means corresponding to the recording magnification, a memory means to memorize the read out signals of the original reading out means, a means of generating the second clock signals which set the reading out speed from the memory means, a means of setting the clock frequency of the second clock signal generating means corresponding to the recording magnification, and a means of modulating the laser light corresponding to the signals read out from the memory means and scanning the laser light on the recording medium.

The objects of this invention other than those described so far and the characteristics of this invention will become self evident from the embodiments described in detail in the following.

BRIEF DESCRIPTION OF DRAWINGS

FIG. 4 shows the case of equal sized magnfication of the original, FIG. 5 the case of reduction, and FIG. 6 the case of magnification.

DESCRIPTION OF PREFERRED EMBODIMENTS

Figure 1:
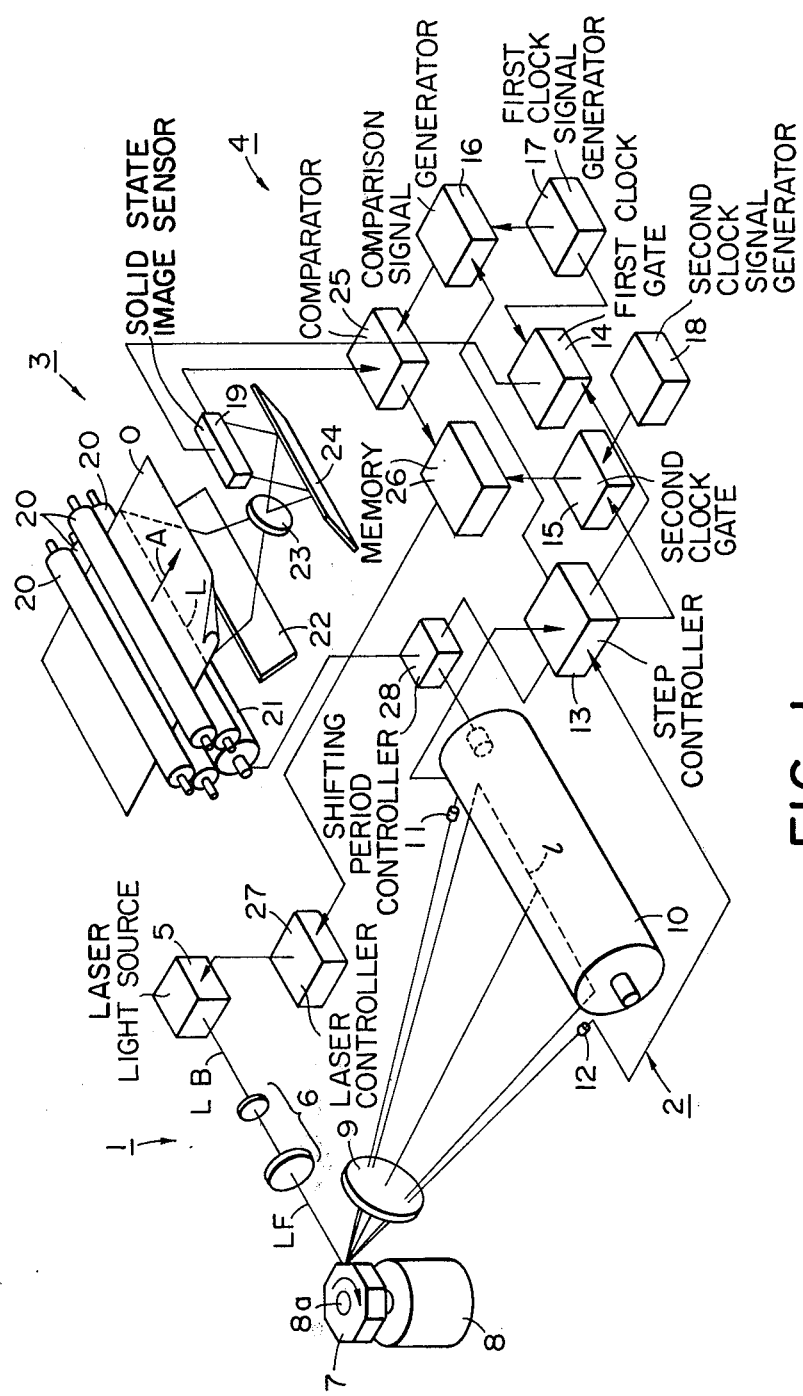
FIG. 1 is an explanatory drawing of one embodiment of the laser recording apparatus according to this invention.

FIG. 1 is a drawing explaining the configuration of one embodiment of apparatus according to this invention.

1 is the laser scanning mechanism where a laser beam coming from the laser light source is modulated corresponding to the data signals to be recorded and is used to scan the recording medium surface. 2 is the picture recording mechanism. In the apparatus shown in the drawing a photosensitive drum is used as the recording medium which receives laser scanning exposure to establish picture recording based on the electrophotographic method and the well known electrophotographic processing means (not shown in the drawing) is arranged around said drum. An apparatus where a laser light source is used to make a recording on the recording medium based on the electrophotographic method is described in detail for example in U.S. patent application Ser. No. 594,126, filed July 8, 1975, now abandoned, and continuation application Ser. No. 901,788 filed May 1, 1978, now U.S. Pat. No. 4,233,612, issued Nov. 11, 1980 made by the present applicant. 3 is the original reading out mechanism where the optical data from the original is read out and converted into time sequential electrical signals by the photoelectric conversion elements as described later is detail. 4 is the control mechanism which controls and coordinates each operation of the laser scanning mechanism, picture recording mechanism, and said original reading out mechanism.

In the drawing the symbol 5 shows the semi-conductor laser light source, 6 the beam expander, 7 the polygonal mirror, 8 the drive motor for the polygonal mirror, 9 the fθ lens system, and 10 the light sensitive drum.

The symbols 11 and 12 show the photodetectors, 13 the step controller, 14 the first clock gate, 15 the second clock gate, 16 the comparison signal generator, 17 the clock signal generator, 18 the second clock signal generator and 19 the solid state image sensor. Symbol 20 shows the original conveying rollers, 21 the drive roller for the original conveying rollers, 22 and 24 show the reflection mirrors, 23 the image forming lens system, 25 the comparator, 26 the memory, 27 the laser controller, and 28 the shifting period controller.

Each mechanism will be described in detail in the following.

The laser beam LB radiated from the laser source 5 corresponding to the data signal is expanded by the beam expander 6 to the laser beam LF having a predetermined cross sectional area, which is incident on the rotary polygonal mirror 7 and then reflected. This polygonal mirror is a equilateral polygonal cylinder, having a mirror on each lateral side, which is fixed to the rotary shaft 8a of the drive motor 8 and which rotates at a predetermined high angular speed in the direction of the arrow at time of operation. Since by this rotation the incident angle of the laser beam LF to the mirror surface at the incident section varies continuously, the reflected laser beam LF deflects periodically in one plane.

The reflected light transmits through the fθ lens system 9 and coverges on the surface of the light sensitive body 10.

Accordingly, the converging point of the laser beam LF by the fθ lens system 9 is shifted in the fixed straight line region, which becomes the writing-out main scanning line l, by the deflection of the laser beam LF.

Of course one portion of the light sensitive body 10 installed rotatively in the direction of the arrow coincides with the main scanning line l over the direction of the rotary shaft.

On the other hand, the original 0 to the recorded, is conveyed at copying time by the original conveying rollers 20 in the direction of arrow A which can be called the subscanning direction.

The main scanning line L is located at the original conveying surface, fixed in the apparatus space.

The main scanning line L is a fixed straight line region and main scanning is performed on the portion of the original on the line.

The solid state image sensor 19, a unitized member formed by closely arranging a great number of very small light accepting elements in one direction in a line and having a self scanning function has a light accepting area that corresponds to the main scanning line L and is parallel to the main scanning line L.

The reflection mirrors 22, 24 and the image forming lens system 23 are fixed so as to focus on the above-mentioned light accepting region the reduced image of the portion of the original on the main scanning line L.

The width of the main scanning line L is of course determined by the resolving power of the lens system 23.

When the reduced image of the original portion on the main scanning line L is projected on the optical area of the solid state image sensor 19, an optical electromotive force which corresponds to the amount of accepted light is generated by each light accepting element.

These optical electromotive forces are signalized in the order of the light accepting elements by the self scanning function of the solid state image sensor 19 when drive pulses are applied to the solid state image sensor 19, and then output as time sequential signals.

Although these output signals are of analog quantities they are digitized by way of the comparator 25 and then input to the memory 26.

The capacity 26 has twice as much memory as needed to store the signals obtained by one scanning of the solid state image sensor (called the scanning signal memory amount) and if the two regions having respectively the scanning signal memory amount are called the first memory region and second memory region, writing of input signal is made alternatively to these first and second memory regions.

In other words in the first scanning of the solid state image sensor, its output signals are written for example to the first memory region and the output signals in the next scanning are written to the second memory region.

While the scanning of solid state image sensor for writing data in the second memory region takes place, the memory signals in the first memory region to which writing has already been performed are read out and sent to the laser controller 27.

In other words, for the reading out of the solid state image sensor is delayed one line.

Moreover, in this apparatus, the scanning clock period of the solid state image sensor is made different from the clock period send out to the laser controller for controlling the laser light.

The first clock gate 14, which is responsible for the reading the scanning of the solid state image sensor 19, sends the clock pulses from the first clock generator 18 to the solid state image sensor corresponding to the start signal coming from the step controller 13.

On the other hand, the second clock gate 15, which is responsible for the reading of the memory 27, sends the clock pulses of the second clock generator to memory corresponding to the start signal coming from the step controller 13.

Moreover, the pulse frequency $f_2$ of the second clock generator is set higher than the pulse frequency $f_1$ of the first clock generator, for example, when $f_1$ is 2 MHz, then $f_2$ is set to 3.3 MHz.

By so setting the solid state image sensor is scanned at a low frequency and accomplishes reading scanning with a sufficient margin even when using a low respond solid state image sensor such as CCD. If one reading scanning time is made to coincide with the scanning time of laser light on one surface of the rotary polygonal mirror, then the modulating signals are being sent at a high frequency $f_2$, and the modulation and recording of the laser light can be accomplished in the effective scanning region in about 60% of the scanning time.

For example, in the case where the solid state image sensor is a one dimensional array of 2048 picture elements and $f_1$ is 2 MHz, about 1 m sec. is required for one scanning. However since laser scanning recording needs no useless waiting time, immediate scanning of the next line is made possible. And if the scanning of laser light by each surface of the rotary polygonal mirror is made 1 m sec., even though effective scanning available time is its 60%, or 0.6 sec., scanning is completed within 0.6 m sec. since the data signals are sent to the laser controller at frequency $f_2$, or 3.3 MHz. On the other hand if the laser recording scanning is made simultaneous with the start of the original scanning time and ends the original scanning with the end of the recording as in the conventional cases, about 1.7 m sec. is required. Accordingly, in the case where the set conditions are those of this apparatus, when an original of B4 size (256 mm × 364 mm) is line (main) scanned in the direction of width and subscanning is made at scanning density of 10 lines/mm in the subscanning direction which intersects at right angle with the line which is the longitudinal direction, the main scanning requiring 1 m sec. is repeated 3640 times and the recording can be accomplished in about 3.64 sec. Considering the conventional methods where the main scanning of the same size recording requires about 6.2 sec. including 1.7 m sec. of waiting time the above-mentioned method can be understood to be very efficient.

Although in the above-mentioned embodiment of the apparatus of the invention independent pulse generators are used to generate different predetermined frequencies for the clock pulses scanning the solid state image sensor 19 and for the clock pulses reading out the memory, it is possible to use a single pulse generator which oscillates at the higher frequency of the two frequencies and to obtain individual pulses of predetermined frequencies by frequency dividing the frequency. Further, it is also possible to use a PLL circuit to obtain pulses of higher desired frequency than the oscillation frequency by way of the feedback loop of the frequency divider.

Moreover, although it is practically effective to utilize the analog signals read out by the solid state image sensor as the laser on-off signals by ignoring the original density and by storing them in memory 26, it is further effective to be able to reproduce the gradation of the original in the reproduced recording.

The comparator 25 in the embodiment of the apparatus of this invention does not merely amplify the read out signals of the solid state image sensor. The comparator 25 not only discriminates the presence or absence of signal on the original but also, when the signal is not sufficiently dense, or when the original signal is representing the gradation, it discriminates and classifies the original density into 4 steps. In the concrete example of this recording, a perfect density representation is realized with two scannings. The comparison signals from the comparison signal generator 16 are sent to the comparator 25 as two kinds at each scanning process and as two different kinds between the repeated two scannings, for a total of 4 kinds of comparison signals during two scanning periods.

Figure 2:
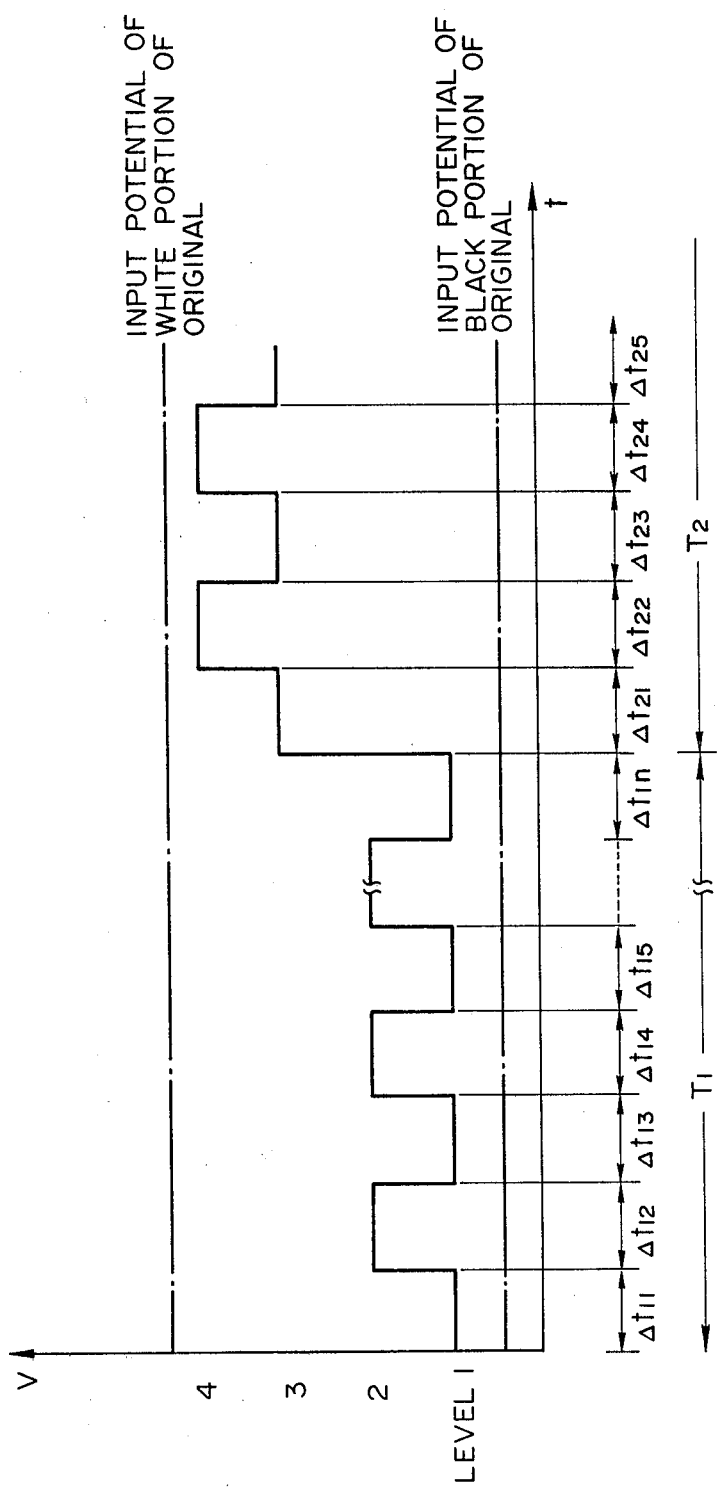
FIG. 2 is an explanatory drawing showing the signal conditions of the comparator used in reproducing tone gradation of the shown apparatus.

FIG. 2 shows the states of comparison signals in each scanning process.

Since the same pulse as used in the scanning of the solid state image sensor is sent to the comparison signal generator 16 from the first pulse generator 17, the comparison signal is synchronized with the image sensor scanning.

In the first scanning the comparison signal issues the first and second levels of potential alternatively at frequency $f_1$. In the second scanning the comparison signal issues the third and fourth levels of potential alternatively at the same frequency $f_1$.

This level switching for each scanning is most easily attained by adjusting the potential difference between the level 1 and level 3 corresponding to the first and third scannings, utilizing the pulses from the pulse generator.

The read out signals input to the comparator together with such comparison signals is compared with the level 1 or level 2 in the first scanning process $T_1$. In other words, if the read out signal is greater than level 1 during $\Delta t_{11}$, $\Delta t_{13}$, $\Delta t_{15}$, ... (not so dense as the darkest part in the case of black tone original) the signal is weighted with the value of 1.5 and if the signal is smaller than the level 1 (so dense as the darkest portion), the signal is weighted with the value of 0.5.

If the read out signal is greater than the level 2 during $\Delta t_{12}$, $\Delta t_{14}$, $\Delta t_{16}$, ... the signal is weighted with 2.5 and if the signal is smaller than the level 2 the signal is weighted with 1.5. During the 2nd scanning process $T_2$ that follows, the levels of comparison signals are closer to the third and fourth levels. If during $\Delta t_{21}$, $\Delta t_{23}$, ... of the level 3 the signal becomes greater than the level 3, the signal value becomes 3.5, the value 0.5 greater than 3, and if the signal is smaller than the level 3, the signal value is 2.5, the value smaller than 3 by 0.5. The same applies to each pulse of the level 4.

By scanning 2 lines in this way the $\Delta t_{11}$ and $\Delta t_{12}$ of $T_1$, for example, of a line are adjacent to the positions $\Delta t_{21}$ and $\Delta t_{22}$ of the adjacent line up and down and they represent the density of a picture element well.

Next, since the apparatus according to this invention is enabled to enlarge or reduce the recording picture effectively, it will be described in the following.

In the apparatus according to this invention, although the reading out of the original is made by scanning the original in a main scanning direction of the solid state image sensor and at the same time by shifting relatively the positional relationship of the original and the solid state image sensor in the subscanning direction which is perpendicular to the main scanning direction, the scanning speed in the subscanning direction is first varied to be set to the predetermined value.

Accordingly when shifting the original as shown in the example, its conveying speed is varied and if the optical system etc. are moved, leaving the original at fixed position, the moving speed is varied. Moreover, the pulse frequency $f_2$ of the memory signal read out clock signal sent from the memory to the laser controller is also made variable to be set to a predetermined frequency together with the setting of the above-mentioned subscanning speed.

More particularly, in the case where recording is changed from equal size recording to 1.5 times enlarged recording, the subscanning speed of reading out system is set to 1/1.5 times the case of equal size and the pulse frequency $f_2$ is also set to $\frac{2}{3}$ times the frequency of same size recording.

By doing so, the line density in the subscanning direction of the original becomes higher. Moreover, since the pulse width of the pulse frequency is changed to $\frac{2}{3}$ times when the picture signals are read from the memory, on the recording surface of the laser light the size is magnified 1.5 times both in the main scanning direction and in the subscanning direction.

On the other hand, in the case of reduction, the same principle can apply and in the case of reducing, for example, to 0.7 times, the subscanning speed of the reading out system is made 1/0.7 times the speed of equal size recording and the pulse frequency $f_2$ is also made 1/0.7 times.

In varying the reading out time of the memory in this way, since, in the case of enlarging, the scanning on the recording surface is ended before all of the memory signals for each line are read out, the operation is moved to read out of the next line.

On the other hand, in the case of reduction, the beam can continue scanning of the recording surface after reading out memory signals of one line. In this case it is desirable to treat the scanned signals as white signals.

Figures 3, 3B:
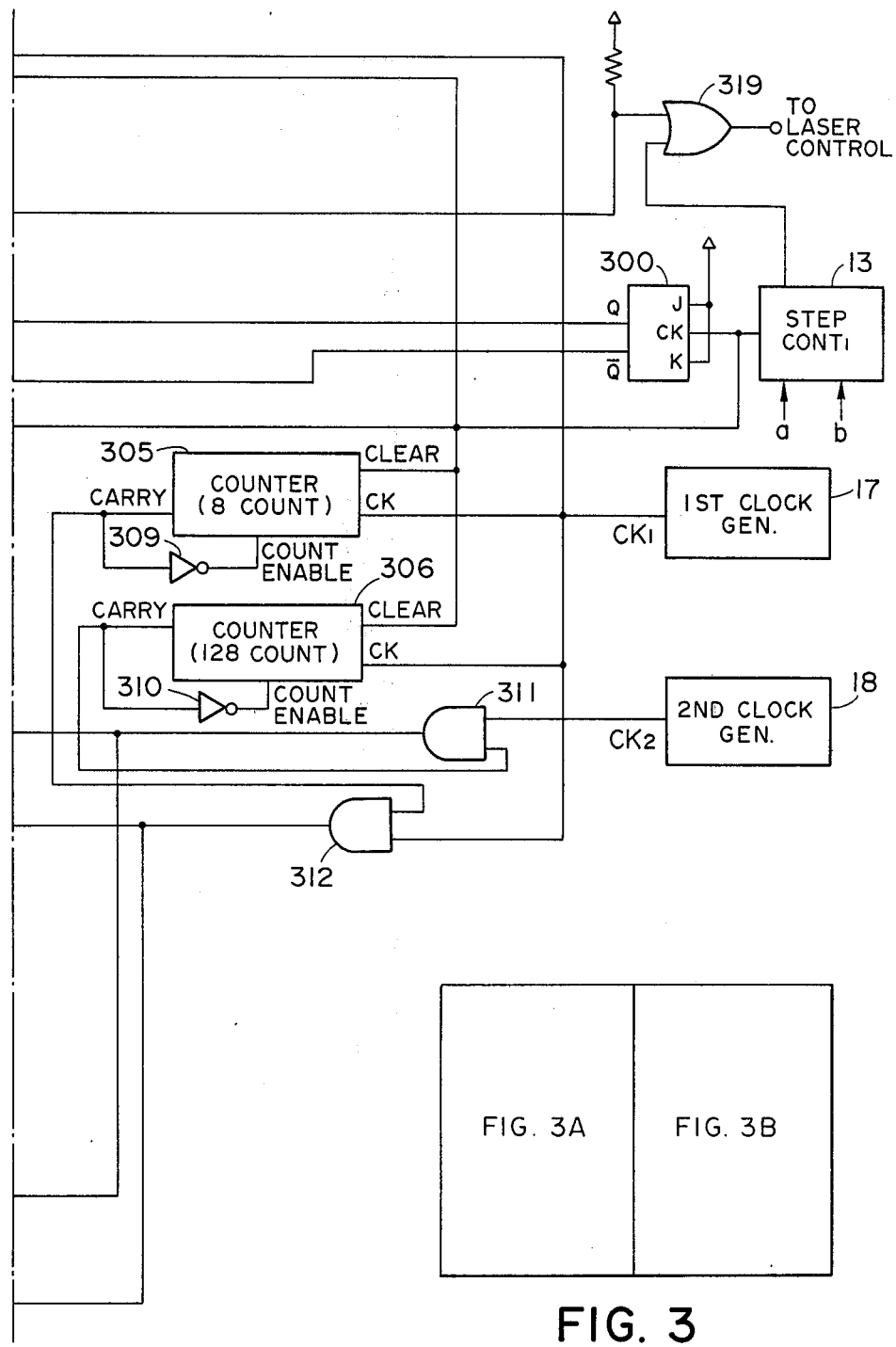
FIG. 3, including A and B, is a functional block diagram of the control mechanism of the embodimental apparatus according to this invention.
Figure 3A:
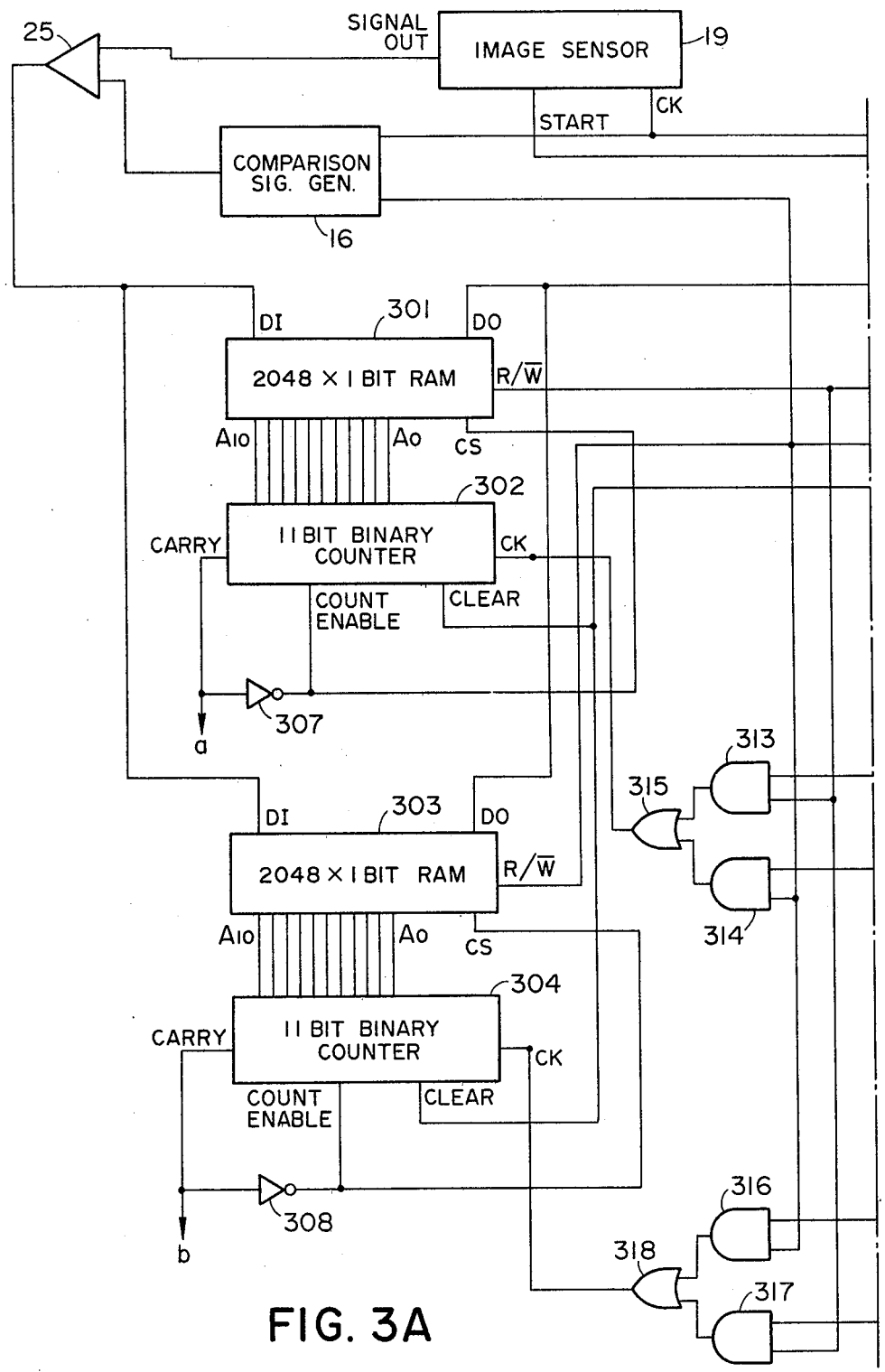

FIG. 3 is a functional block diagram which describes an example of the configuration of the control mechanism of the above-mentioned apparatus.

The same numbers are applied to the blocks having the same functions as the already-mentioned blocks such as the step controller 13, comparison signal generator 16, first clock generator 17, second clock generator 18, and comparator 25.

The outputs of the step controller 13 are utilized as the switching signal of JK flip-flop circuit 300 and as the start-clear signals of the image sensor 19, two sets of binary counters 302 and 304, and two sets of counters 305 and 306.

The clock signal $CK_1$ of the first clock generator 17 is connected to the image sensor 19, comparison signal generator 16, two sets of counters 305 and 306, and AND GATE 312.

On the other hand, the clock signal $CK_2$ of the 2nd clock generator is connected to AND GATE 311.

The signal $CK_1$ of the first clock generator which is connected to AND GATE 312 is connected therethrough to AND GATES 314 and 317 when the counter 305 is ON.

Other input terminals of the GATES 314 and 317 are connected to different output terminals of JK flip-flop circuit respectively, or more particularly, 314 is connected to $\overline{Q}$ side and 317 to Q side, and one is OFF when the other is ON.

Accordingly corresponding to the setting of the JK flip-flop circuit one of the GATES is ON, and according to $CK_1$ is out-put only to the ON side of the JK flip-flop circuit.

On the other hand, the signal $CK_2$ of the second clock generator connected to AND GATE 311 is connected therethrough to AND GATES 313 and 316 when the counter 306 is ON. To the other input terminals of these gates the different output terminals of JK flip-flop, or more particularly, 313 is connected to Q side and 316 to $\overline{Q}$ side. This means that each is connected in the reverse relationship to the relationship between the adjacent AND GATES 314 and 317. According to the OR-GATES 315 and 318 to which these outputs are connected, $CK_1$ is output to one of them and $CK_2$ to the other. And the outputs of these OR-GATES 315 and 318 are connected respectively to the binary counters (11 bits in the drawing) 302 and 304. Moreover the output of the JK flip-flop is connected to the two sets of memory units 301 and 303.

One of the memory units so connected (for example, random access memory units of $2048 \times 1$ bit) enters the state to write and store the read out signals from the image sensor and the other enters the state to read out and utilize the memory for laser modulation corresponding to the states of JK flip-flop outputs Q and $\overline{Q}$.

Each of the binary counters 302 and 304, which designates each memory address, and the counters 305 and 304, which sets the write and read timings, issues carry signal, and is provided with the inverters 307, 308, 309, and 310 to hold the inside of the counter by utilizing its position.

The symbol 319 shows an OR circuit provided on the circuit which outputs the signal read out from one of the memory units, and the output from 313 is connected to the step controller to provide a signal which whitens the marginal portion which may be produced at time of reduction.

Figure 4:
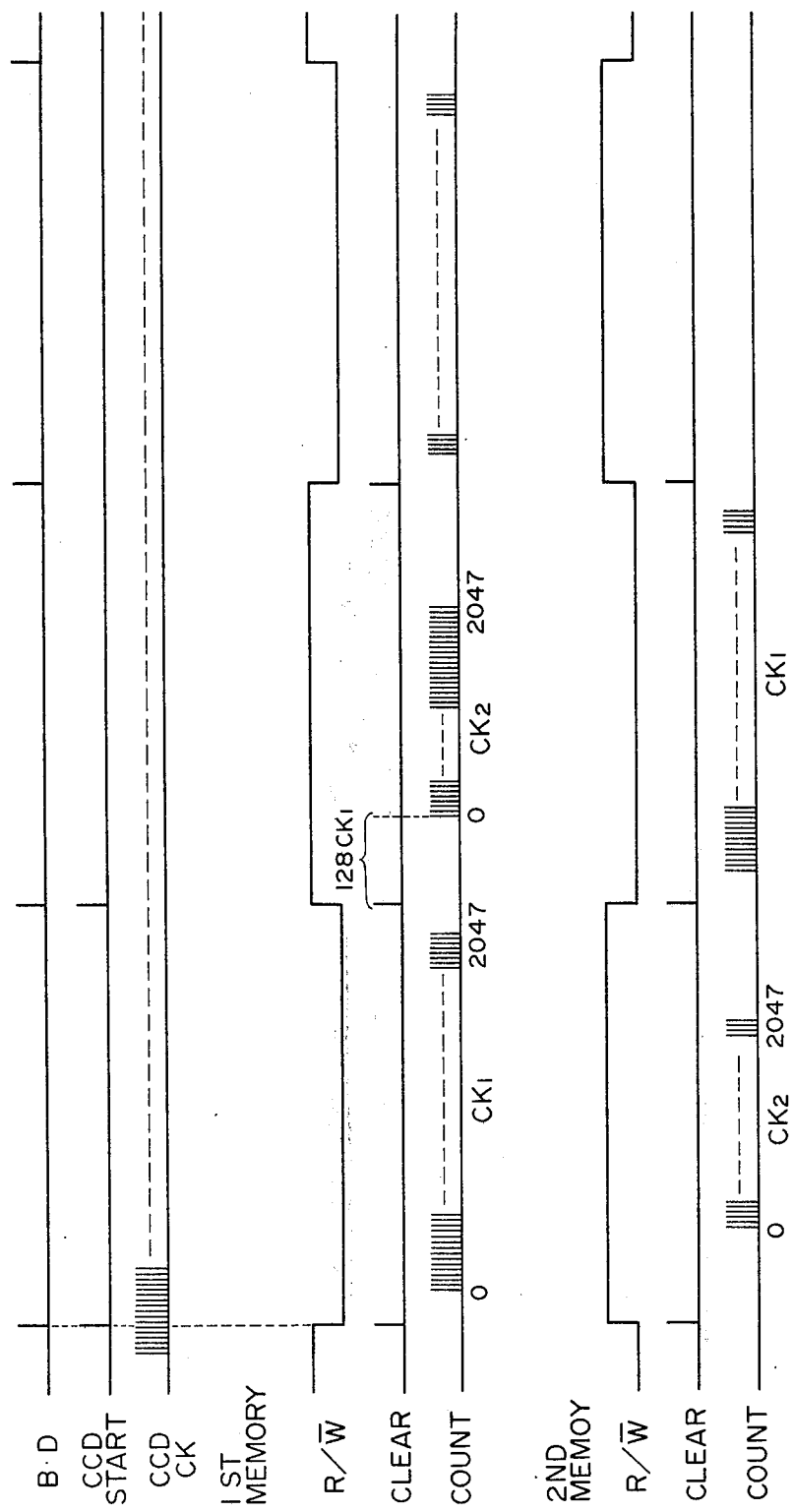
FIGS. 4 to 6 are timing charts explaining the operation of the first and second memories.

FIG. 4 is the time chart showing the operating states of the image sensor and the first and second memories.

Figure 5:
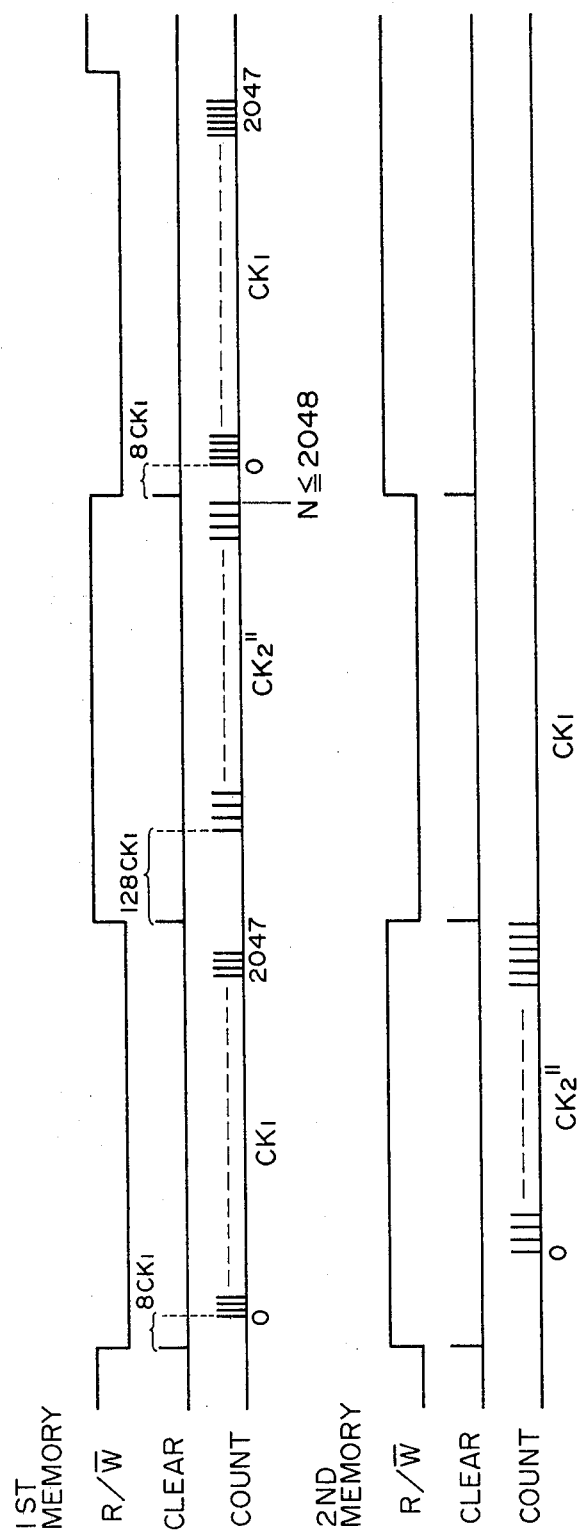
Figure 6:
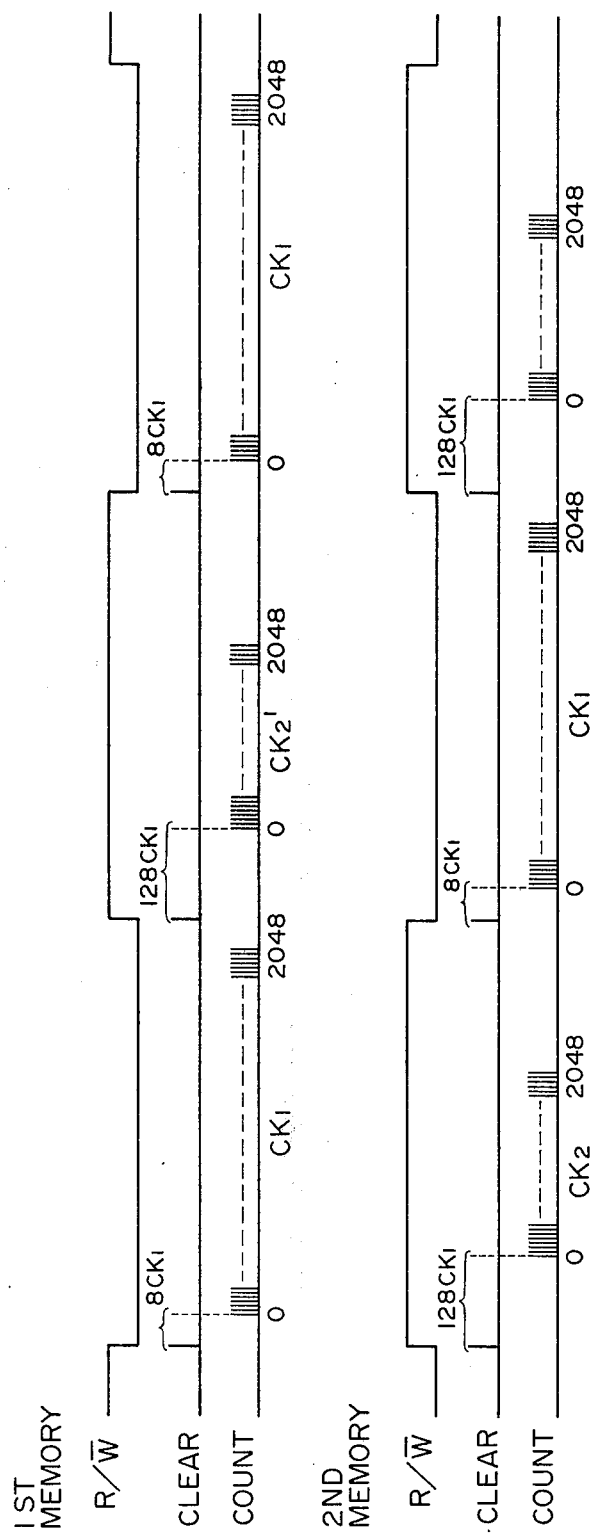

The example shown in the drawing is used to reproduce the original in equal size. The one shown in FIG. 5 is the case of reduction by accelerating $CK_1'$ and the one shown in FIG. 6 is the case of magnification by decelerating $CK_2''$.

What I claim is:

1. A laser recording method in which recording is made on a recording medium with a laser beam modulated in accordance with a signal corresponding to an original to be recorded, comprising the steps of:

reading an original to be recorded line by line in its main scanning direction at a first clock frequency, with original reading means having a photoelectric means, and for each line so read generating a read signal therefrom;

transferring the read signal generated by the reading means to memory means for storage therein;

while said reading means is reading one line on the original, reading out of said memory means as an output signal at a second clock frequency higher than the first clock frequency, the read signal corresponding to the line on the original immediately preceding the one line;

controlling a laserbeam at the second clock frequency in accordance with the output signal thus read out;

scanning with the laser beam by moving a movable reflecting surface wherein the time required for one effective scan is shorter than that required for said original reading means to read one line of the original, said second clock frequency being related to the time required for one effective scan; and recording the image of the original on the recording medium with the laser beam thus scanned and controlled in a one-to-one magnification relationship.

2. A laser recording method in which recording is made on a recording medium with a laser beam modulated in accordance with a signal corresponding to an original to be recorded, comprising the steps of:

reading an original line by line in its main scanning direction at a first clock frequency for each line so read, with original reading means having a photoelectric conversion element, and generating read signals therefrom;

after each line is read by the reading means, shifting the original relative to the reading means, in a direction perpendicular to the direction of scanning by a predetermined feed amount to thereby be positioned to read the next adjacent line;

transferring the read signal generated by the reading means to memory means for storage therein, the memory means having sufficient capacity for storing at least read signals corresponding to adjacent lines read by the reading means;

while the reading means is reading one line on the original, reading out of the memory means, as an output signal, at a second clock frequency higher than the first clock frequency, the read signal corresponding to the line on the original immediately preceding the one line;

controlling a laser beam at the second clock frequency in accordance with the output signal thus read out;

scanning with the laser beam by moving a movable reflecting surface wherein the time required for one effective scan is shorter than that required for said original reading means to read one line of the original, said second clock frequency being related to the time required for one effective scan; and recording the image of the original on the recording medium with the laser beam thus scanned and controlled.

3. A laser recording method in which recording is made on a recording medium with a laser beam modulated in accordance with a signal corresponding to an original to be recorded, comprising the steps of:

reading an original to be recorded, line by line, at a first clock frequency for each line so read, in its main scanning direction with original reading means having a photoelectric conversion element and generating a read signal therefrom;

transferring the read signals generated by the reading means to memory for storage therein, said memory means being capable of storing at least the read signals corresponding to adjacent lines read by the reading means;

while the reading means is reading one line of the original, reading out of the memory means, as an output signal, at a second clock frequency higher than the first clock frequency, the read signal corresponding to the line immediately preceding the one line;

controlling a laser beam at the second clock frequency in accordance with the output signal thus read out;

scanning with the laser beam by moving plural movable reflecting surfaces wherein the time required for one effective scan by each of said reflecting surfaces is shorter than that required for said original reading means to read one line of the original, said second clock frequency being related to the time required for one effective scan; and recording the image of the original in equal magnification on the recording medium with the laser beam thus scanned and controlled.

4. A laser recording apparatus for recording on a recording medium with a laser beam modulated in accordance with a signal corresponding to an original to be recorded, comprising:

original reading means, including a photoelectric conversion element, for reading an original line by line in its main scanning direction, and for generating read signals indicative thereof;

means for generating a first clock signal having a first frequency for setting the speed at which said reading means reads a line on the original;

memory means having sufficient capacity for storing the read signals corresponding to at least two adjacent lines read by said reading means;

memory reading out means for, while said reading means is reading one line of the original, reading out as an output signal the read signal corresponding to the line on the original immediately preceding the one line;

means for generating a second clock signal having a second frequency higher than the first frequency setting the speed at which said reading out means reads said output signals from said memory means;

means for generating a laser beam;

means for modulating the laser beam at the second frequency in response to the output signal of said memory reading out means; and an optical system for projecting the modulated laser beam onto the recording medium to record an image of the original, said optical system including a movable reflecting surface to scan the recording medium with the laser beam, the time required for one effective scan being shorter than that required for said original reading means to read one line in the original and said second clock frequency being related to the time required for one effective scan.

5. A laser recording apparatus for recording on a recording medium with a laser beam modulated in accordance with a signal corresponding to an original to be recorded;

original reading means, for reading an original line by line in a main scanning direction, and generating a read signal corresponding thereto;

means for generating a first clock signal having a first frequency for setting the speed at which said reading means reads a line on the original;

means for shifting the original relative said original reading means in a direction perpendicular to the main scanning direction to thereby be positioned to scan the next adjacent line of the original;

memory means for storing the read signals read out by said reading means;

memory reading out means for, while said reading means is reading one line on the original, reading out, as output signals, the signals corresponding to the line on the original preceding the one line from said memory means at a second clock frequency higher than the first clock frequency;

means for generating a laser beam;

means for modulating the laser beam at the second frequency in response to the output signal of said memory reading out means; and an optical system for projecting the modulated laser beam onto the recording medium to record a one-to-one image of the original, said optical system including a movable reflecting surface for scanning the recording medium with the laser beam, the time required for one effective scan being shorter than that required for said original reading means to read one line in the original and said second clock frequency being related to the time required for one effective scan.

6. A laser recording apparatus for recording on a recording medium with a laser beam modulated in accordance with a signal corresponding to an original to be recorded, comprising:

original reading means for reading an original in a main scanning direction line by line and generating a read signal corresponding thereto;

means for generating first clock signals which set the speed at which said reading means reads a line on the original;

means for shifting the original relative to the original reading means by a predetermined amount after each line is read by the original reading means, in a direction perpendicular to the main scanning direction;

memory means having a capacity sufficient to store at least read signals generating by said reading means corresponding to two adjacent lines of the original;

means for generating a second clock signal having frequency higher than the frequency of the first clock signal;

means for reading out from the memory at the second clock frequency as output signals the stored read signals;

means for generating a laser beam;

means for modulating the laser beam at the second clock frequency in accordance with the output signals read out by said reading out means; and an optical system for projecting the modulated laser beam onto the recording medium to record a one-to-one image of the original, said optical system including a rotatable mirror having plural reflecting surfaces to scan the recording medium with the laser beam, the time required for one effective scan being shorter than that required for said original reading means to read one line of the original and said second clock frequency being related to the time required for one effective scan.

* * * * *

UNITED STATES PATENT AND TRADEMARK OFFICE
CERTIFICATE OF CORRECTION

PATENT NO. : 4,422,102

DATED : December 20, 1983

INVENTOR(S) : YASUYUKI TAMURA

It is certified that error appears in the above-identified patent and that said Letters Patent is hereby corrected as shown below:

Column 3

Line 16, delete "embodimental".

Column 4

Line 63, change "capacity" to --memory--, and change "memory" to --capacity--.

Column 5

Line 18, delete "the", second occurrence.

Line 33, after "setting" insert --,--.